United States Patent
Jackson

(10) Patent No.: US 9,778,959 B2
(45) Date of Patent: Oct. 3, 2017

(54) SYSTEM AND METHOD OF PERFORMING A PRE-RESERVATION ANALYSIS TO YIELD AN IMPROVED FIT OF WORKLOAD WITH THE COMPUTE ENVIRONMENT

(71) Applicant: III HOLDINGS 12, LLC, Wilmington, DE (US)

(72) Inventor: David B. Jackson, Spanish Fork, UT (US)

(73) Assignee: III Holdings 12, LLC, Wilmington, DE (US)

( * ) Notice: Subject to any disclaimer, the term of this patent is extended or adjusted under 35 U.S.C. 154(b) by 435 days.

(21) Appl. No.: 14/106,254

(22) Filed: Dec. 13, 2013

(65) Prior Publication Data

US 2014/0101666 A1   Apr. 10, 2014

Related U.S. Application Data

(63) Continuation-in-part of application No. 11/616,156, filed on Dec. 26, 2006, now Pat. No. 8,782,654,
(Continued)

(51) Int. Cl.
*G06F 9/46*       (2006.01)
*G06F 15/16*      (2006.01)
(Continued)

(52) U.S. Cl.
CPC .......... *G06F 9/5083* (2013.01); *G06F 9/5038* (2013.01); *G06F 9/5072* (2013.01); *G06F 2209/506* (2013.01); *G06F 2209/5014* (2013.01)

(58) Field of Classification Search
None
See application file for complete search history.

(56) References Cited

U.S. PATENT DOCUMENTS 5,826,236 A   10/1998   Narimatsu et al.
5,862,478 A    1/1999   Cutler et al.
(Continued)

FOREIGN PATENT DOCUMENTS

EP   0 605 106   7/1994
JP   8212084     8/1996
(Continued)

OTHER PUBLICATIONS

He et al., "QoS Guided Min-Min Heuristic for Grid Task Scheduling," J. Comput. Sci. & Technol., Jul. 2003, vol. 18, No. 4, pp. 442-451.
(Continued)

*Primary Examiner* — Bing Zhao

(57) ABSTRACT

A system and method are disclosed for receiving a request for resources in a compute environment to process workload, the request including a specification of a quality of fit. The system generates a substantial maximum potential quality of fit based on compute environment with an assumption of no competing workload to yield an analysis. The system evaluates a first resource allocation and a second resource allocation against the analysis to yield the first fit in a respective second fit. The system selects one of the first resource allocation and the second resource allocation based on a comparison of the first fit to the second fit as well as a cost associated with any delays.

18 Claims, 7 Drawing Sheets

Related U.S. Application Data which is a continuation-in-part of application No. 10/530,582, filed as application No. PCT/US2005/008297 on Mar. 11, 2005, now Pat. No. 7,971,204.

(60) Provisional application No. 60/552,653, filed on Mar. 13, 2004, provisional application No. 60/603,296, filed on Aug. 20, 2004.

(51) Int. Cl.
*G06F 15/173* (2006.01)
*G06F 9/50* (2006.01)

(56) References Cited

U.S. PATENT DOCUMENTS

| | | | |
|---|---|---|---|
| 6,003,061 A | 12/1999 | Jones et al. | |
| 6,278,712 B1 | 8/2001 | Takihiro et al. | |
| 6,282,561 B1 | 8/2001 | Jones et al. | |
| 6,333,936 B1 | 12/2001 | Johansson et al. | |
| 6,418,459 B1 | 7/2002 | Gulick | |
| 6,460,082 B1 | 10/2002 | Lumelsky et al. | |
| 6,571,215 B1 | 5/2003 | Mahapatro | |
| 6,687,257 B1 | 2/2004 | Balasubramanian | |
| 6,690,647 B1 | 2/2004 | Tang et al. | |
| 6,745,246 B1 | 6/2004 | Erimli et al. | |
| 6,850,966 B2 | 2/2005 | Matsuura et al. | |
| 6,912,533 B1 | 6/2005 | Hornick | |
| 6,948,171 B2 | 9/2005 | Dan et al. | |
| 6,952,828 B2 | 10/2005 | Greene | |
| 7,093,256 B2 | 8/2006 | Bloks | |
| 7,177,823 B2 | 2/2007 | Lam et al. | |
| 7,225,442 B2 | 5/2007 | Dutta et al. | |
| 7,233,569 B1 | 6/2007 | Swallow | |
| 7,328,264 B2 | 2/2008 | Babka | |
| 7,328,406 B2 | 2/2008 | Kalinoski et al. | |
| 7,386,586 B1 | 6/2008 | Headley et al. | |
| 7,403,994 B1 | 7/2008 | Vogl et al. | |
| 7,546,553 B2 | 6/2009 | Bozak et al. | |
| 7,568,199 B2 | 7/2009 | Bozak et al. | |
| 7,620,706 B2 | 11/2009 | Jackson | |
| 7,640,547 B2 | 12/2009 | Neiman et al. | |
| 7,685,599 B2 | 3/2010 | Kanai et al. | |
| 7,730,488 B2* | 6/2010 | Ilzuka | G06F 9/5044 709/201 |
| 7,810,090 B2 | 10/2010 | Gebhart | |
| 8,151,103 B2 | 4/2012 | Jackson | |
| 8,346,908 B1 | 1/2013 | Vanyukhin et al. | |
| 8,544,017 B1 | 9/2013 | Prael et al. | |
| 8,782,120 B2 | 7/2014 | Jackson | |
| 9,128,767 B2 | 9/2015 | Jackson | |
| 2001/0023431 A1 | 9/2001 | Horiguchi | |
| 2002/0004833 A1 | 1/2002 | Tonouchi | |
| 2002/0007389 A1 | 1/2002 | Jones et al. | |
| 2002/0052909 A1 | 5/2002 | Seeds | |
| 2002/0052961 A1 | 5/2002 | Yoshimine et al. | |
| 2002/0120741 A1 | 8/2002 | Webb et al. | |
| 2002/0156699 A1 | 10/2002 | Gray et al. | |
| 2003/0154112 A1 | 8/2003 | Neiman et al. | |
| 2003/0187907 A1 | 10/2003 | Ito | |
| 2004/0010592 A1 | 1/2004 | Carver et al. | |
| 2004/0073650 A1 | 4/2004 | Nakamura | |
| 2004/0109428 A1 | 6/2004 | Krishnamurthy | |
| 2004/0122970 A1 | 6/2004 | Kawaguchi et al. | |
| 2004/0172464 A1 | 9/2004 | Nag | |
| 2004/0193674 A1 | 9/2004 | Kurosawa et al. | |
| 2004/0204978 A1 | 10/2004 | Rayrole | |
| 2004/0216121 A1 | 10/2004 | Jones et al. | |
| 2004/0260746 A1 | 12/2004 | Brown et al. | |
| 2005/0027865 A1 | 2/2005 | Bozak et al. | |
| 2005/0188089 A1 | 8/2005 | Lichtenstein et al. | |
| 2005/0228892 A1 | 10/2005 | Riley et al. | |
| 2005/0278760 A1 | 12/2005 | Dewar et al. | |
| 2006/0229920 A1 | 10/2006 | Favorel | |
| 2007/0220520 A1* | 9/2007 | Tajima | G06F 9/4881 718/104 |
| 2008/0235702 A1 | 9/2008 | Eilam et al. | |

FOREIGN PATENT DOCUMENTS

| | | |
|---|---|---|
| JP | 2005165568 | 6/2005 |
| WO | WO 98/58518 | 12/1998 |
| WO | WO-00/25485 | 5/2000 |
| WO | WO 2005/089245 | 9/2005 |
| WO | WO 2005/091136 | 9/2005 |

OTHER PUBLICATIONS

Buyya et al., "An Evaluation of Economy-based Resource Trading and Scheduling on Computational Power Grids for Parameter Sweep Applications," S. Hariri et al. (Eds.), *Active Middleware Services,* Springer Science + Business Media, New York, 2000, pp. 221-230.

Mateescu, G., "Quality of Service on the grid via metascheduling with resource co-scheduling and co-reservation," The International Journal of High Performance Computing Applications, vol. 17, No. 3, 2003, 10 pages.

Roblitz et al., "Resource Reservation with Fuzzy Requests", Concurrency and Computation: Practice and Experience, 2005.

Le, "The data-ware resource broker," Research project thesis, University of Adelaide, Nov. 2003, pp. 1-63.

Ali et al., "Task execution time modeling for heterogenous computing systems," IEEE, 2000, pp. 1-15.

Kafil et al., "Optimal task assignment in heterogenous computing systems," IEEE, 1997, pp. 135-146.

Maheswaran et al., "Dynamic matching and scheduling of class of independent tasks onto heterogenous computing systems," IEEE, 2002, pp. 1-15.

Stankovic et al., "The case for feedback control real-time scheduling," IEEE, 1999, pp. 1-13.

Snell et al., "The performance impact of advance reservation meta-scheduling," Springer-Verlag, Berlin, 2000, pp. 137-153.

Final Office Action issued on U.S. Appl. No. 3/855,241, mailed Sep. 15, 2016.

Final Office Action on U.S. Appl. No. 13/760,600 mailed Jan. 23, 2017.

Furmento et al. "An Integrated Grid Environment for Component Applications," Workshop on Grid Computing, 2001, pp. 26-37.

Non-Final Office Action on U.S. Appl. No. 14/709,642, mailed Feb. 17, 2016.

Non-Final Office Action on U.S. Appl. No. 14/751,529, mailed Nov. 14, 2016.

Amiri et al., "Dynamic Function Placement for Data-intensive Cluster Computing," USENIX Annual Technical Conference, Jun. 2000, 16 pages.

Final Office Action issued on U.S. Appl. No. 11/616,156, mailed Oct. 13, 2011.

Final Office Action issued on U.S. Appl. No. 12/573,967, mailed Apr. 1, 2014.

Non-Final Office Actin issued on U.S. Appl. No. 11/616,156, mailed Jan. 18, 2011.

Non-Final Office Action issued on U.S. Appl. No. 10/530,577, mailed May 29, 2015.

Non-Final Office Action issued on U.S. Appl. No. 12/573,967, mailed Mar. 1, 2012.

Non-Final Office Action issued on U.S. Appl. No. 13/760,600, mailed Apr. 10, 2015.

Non-Final Office Action issued on U.S. Appl. No. 13/855,241, mailed Jan. 13, 2016.

Non-Final Office Action issued on U.S. Appl. No. 13/855,241, mailed Jul. 6, 2015.

Non-Final Office Action on U.S. Appl. No. 14/331,718 mailed Feb. 28, 2017.

Notice of Allowance issued on U.S. Appl. No. 11/616,156, mailed Mar. 25, 2014.

(56) References Cited

OTHER PUBLICATIONS

Notice of Allowance issued on U.S. Appl. No. 12/573,967, mailed Jul. 29, 2015.
Notice of Allowance on U.S. Appl. No. 10/530,577, mailed Oct. 15, 2015.
Non-Final Office Action on U.S. Appl. No. 14/842,916 mailed May 5, 2017.
Notice of Allowance issued on U.S. Appl. No. 14/454,049, mailed Jan. 20, 2015.
Non-Final Office Action on U.S. Appl. No. 13/760,600 dated Jun. 15, 2017.
Notice of Allowance on U.S. Appl. No. 14/331,718 dated Jun. 7, 2017.
Non-Final Office Action on U.S. Appl. No. 14/709,642 dated Jul. 12, 2017.

\* cited by examiner

FIG. 1

| | $J_1$ $WC_{min}$ = 240 UNITS |
|---|---|
| $N_1$ | SPEED $(J_1)$ = 1.0 |
| $N_2$ | SPEED $(J_1)$ = 1.5 |
| $N_3$ | SPEED $(J_1)$ = 1.2 |
| $N_4$ | SPEED $(J_1)$ = 1.0 |

START TIME RANGES

COMPLETION TIME RANGES

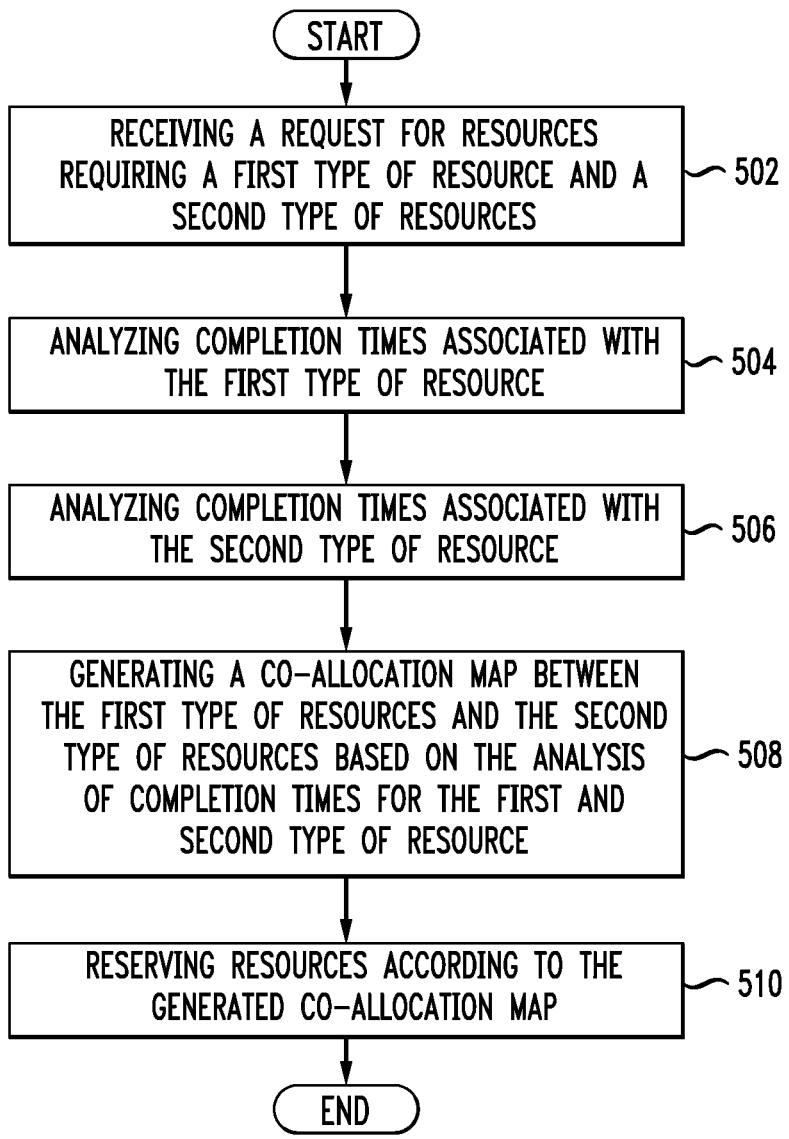

SYSTEM AND METHOD OF PERFORMING A PRE-RESERVATION ANALYSIS TO YIELD AN IMPROVED FIT OF WORKLOAD WITH THE COMPUTE ENVIRONMENT

PRIORITY CLAIM

The present application is a continuation-in-part of U.S. application Ser. No. 11/616,156 filed Dec. 26, 2006, now U.S. Pat. No. 8,782,654, issued Jul. 15, 2014, which is a continuation-in-part of U.S. application Ser. No. 10/530,582 filed Aug. 11, 2006, now U.S. Pat. No. 7,971,204, issued Jun. 28, 2011, which claims the benefit of PCT Application Number: PCT/US05/008297 filed Mar. 11, 2005, which claims priority to U.S. Provisional Application No. 60/552,653 filed Mar. 13, 2004 and U.S. Provisional Application No. 60/603,296 filed Aug. 20, 2004, the contents of which are incorporated herein by reference.

RELATED APPLICATIONS

The present application is related to U.S. application Ser. No. 10/597,898 now abandoned, Ser. No. 10/530,581, filed Aug. 11, 2006, now U.S. Pat. No. 8,413,155, issued Apr. 2, 2013, Ser. No. 10/530,577, filed Apr. 7, 2005, now U.S. Pat. No. 9,268,607, issued Feb. 23, 2016, Ser. No. 10/530,576, filed Jul. 29, 2008, now U.S. Pat. No. 9,176,785, issued Nov. 3, 2015, Ser. No. 10/530,579, 10/530,578, filed Nov. 28, 2008, U.S. Pat. No. 8,151,103, issued Apr. 3, 2012, Ser. No. 10/530,580, filed Apr. 7, 2005, still pending and Ser. No. 10/530,575, filed Feb. 4, 2008, now U.S. Pat. No. 8,108,869, issued Jan. 31, 2012. The content of each of these cases is incorporated herein by reference. If these application numbers are assigned new application numbers associated with these cases then the applications associated with the newly assigned application numbers are incorporated herein by reference.

BACKGROUND

1. Field of the Disclosure

The present disclosure relates to reservations of resources within a compute environment and more specifically to a system and method of performing a pre-reservation analysis of workload to be processed in a compute environment to determine a best quality fit for that workload based on a number of different factors.

2. Introduction

There are challenges in the complex process of managing the consumption of resources within a compute environment such as a grid, compute farm or cluster of computers. Grid computing may be defined as coordinated resource sharing and problem solving in dynamic, multi-institutional collaborations. Many computing projects require much more computational power and resources than a single computer may provide. Networked computers with peripheral resources such as printers, scanners, I/O devices, storage disks, scientific devices and instruments, etc. may need to be coordinated and utilized to complete a task. The term compute resource generally refers to computer processors, network bandwidth, and any of these peripheral resources as well. Other resources such as license authorization to use software may also be a resource. A compute farm may comprise a plurality of computers coordinated for such purposes of handling Internet traffic. The web search website Google® has a compute farm used to process its network traffic and Internet searches.

Grid/cluster resource management generally describes the process of identifying requirements, matching resources to applications, allocating those resources, and scheduling and monitoring grid resources over time in order to run grid applications or jobs submitted to the compute environment as efficiently as possible. Each project or job will utilize a different set of resources and thus is typically unique. For example, a job may utilize computer processors and disk space, while another job may require a large amount of network bandwidth and a particular operating system. In addition to the challenge of allocating resources for a particular job or a request for resources, administrators also have difficulty obtaining a clear understanding of the resources available, the current status of the compute environment and available resources, and real-time competing needs of various users. One aspect of this process is the ability to reserve resources for a job. A cluster manager will seek to reserve a set of resources to enable the cluster to process a job at a promised quality of service.

General background information on clusters and grids may be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

SUMMARY

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein. An example software application that can utilize the principles set forth below is the Moab® Workload Manager or other software products from Cluster Resources, Inc. or Adaptive Computing, Inc.

The disclosure includes at least a system, method and computer-readable media embodiments. The parent application discloses a system and method embodiment for co-allocating resources within a compute environment. The compute environment may be a grid, a cluster or some other grouping of compute devices under administrative control of a workload manager.

An exemplary system and method includes a method of receiving a request for resources in a compute environment to process workload, the request including a specification of a quality fit. The system generates a maximum potential quality of fit based on the compute environment including an optional assumption that there is no competing workload to yield an analysis. This analysis gives a benchmark for a theoretical maximum potential quality of fit assuming that the workload has access to all the resources. Next, the system evaluates a first resource allocation for the workload against the analysis to yield the first fit. The system also evaluates a second resource allocation for the workload against the analysis to yield a second fit. Finally, the system selects one of the first resource allocation and the second resource allocation based on one of a comparison of the first fit to the second fit and a cost associated with any delay.

An example of this approach could be that a user submits workload with a particular quality fit requirement such as they want the job to run within 2 hours or wait until 2 hours to get a 70% quality fit but don't ever launch the workload unless the system can get at least a 50% quality fit. Upon receiving the request for resources, the system may find available resources in 10 minutes from the current time of receiving the request, in 30 minutes and in an hour. The system will then proceed to analyze each of the resources that are available associated with these times and compare a quality of fit against specific requirements. One aspect could include identifying a baseline evaluation or a maximum potential quality of fit and then considering the various points in time and various resource allocations against this maximum potential quality of fit. This comparison yields a metric that balances response time against such a metric which can be desirable for the user. The maximum potential fit could include an assumption that less than all the resources are available because of failure expectations, other workload, cost of resources, or other reasons.

In another embodiment, the method includes receiving a request for a reservation for a first type of resource and analyzing constraints and guarantees associated with the first type of resource. A system practicing the disclosure identifies a first group of resources that meet the request for the first type of resource and storing the information in a first list, receives a request for a reservation for a second type of resource, analyzes constraints and guarantees associated with the second type of resource and identifies a second group of resources that meet the request for the second type of resource and stores that information in a second list. Finally, the system calculates a co-allocation parameter between the first group of resources and the second group of resources and reserves resources according to the calculated co-allocation parameter of the first group of resources and the second group of resources. What that process does not do is incorporate information about the speed of execution on each of the resources allocated or the completion time for each portion of a job. Consequently, the information is of value but in some circumstances may not of optimal value.

As noted above, the current practice of calculating reservation ranges by looking at when resources become available, looking at the wall clock limit associated with a request and translating availability ranges into start ranges by looking at the various times during which at a request could start and still meet its wall time limit is not optimal. That analysis does not incorporate information about the speed of execution on each of the resources allocated. A proposed method to further enhance the co-allocation of resources comprises receiving a request for resources within a compute environment, determining at least one completion time for processing the request within the compute environment and reserving resources within the compute environment based on the determined at least one completion time. One benefit of doing this approach is to incorporate the availability of the information to determine a completion time range up front while the system still has the current resource information.

Another aspect still uses start time but incorporates the relative speed of each resource to be consumed by the job. Yet another aspect may involve a determination by the system of whether a start time, end time or hybrid analysis will be more efficient or more appropriate for the job and/or the compute environment. In this case, the determination may be a preliminary analysis of the scenario if resources are reserved for a request based on a start time analysis as in the parent case or reserved based on a completion time. The analysis may also be based on a hybrid of both approaches.

In either event, some analysis is performed to determine whether reserving the needed resources for consumption by jobs should be done using one of the two approaches or a hybrid approach.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

FIG. 1 illustrates the maximum time allocated to each node for the job;

FIG. 5 illustrates another method embodiment;

DETAILED DESCRIPTION OF THE DISCLOSURE

Figure 2A:
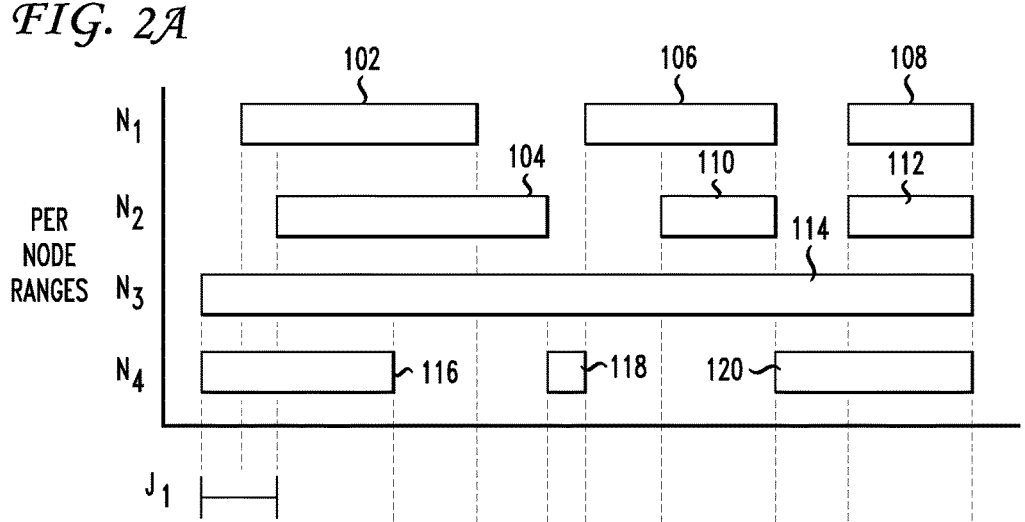
FIG. 2A illustrates a per node range analysis.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The "system" embodiment of the disclosure may comprise a computing device that includes the necessary hardware and software components to enable a workload manager or a software module to perform the steps of the disclosure. As noted above, software such as Cluster Resources' Moab® Workload Manager or other Moab® branded software may utilize the principles herein. Such a computing device, shown by way of example in FIG. 6, may include such known hardware elements as one or more central processors, random access memory (RAM), read-only memory (ROM), storage devices such as hard disks, communication means such as a modem or an Ethernet card to enable networking with other computing devices, a bus that provides data transmission between various hardware components, a keyboard, a display, an operating system and so forth. A processor can also be a virtual processor. There is no restriction that the particular system embodiment of the disclosure has any specific hardware components and any known or future developed hardware configurations are contemplated as within the scope of the disclosure when the computing device operates as is claimed. The compute environment such as a cluster or grid with its workload managed according to these principles may also be an embodiment. A module performing any particular function may include software controlling one or more hardware components.

The parent application incorporated herein by reference includes details regarding submitting jobs to a compute environment and the basic processes involved in workload management for a cluster or grid environment as well as the co-allocation process based on start times. Accordingly, the present application will discuss the subject matter of this application. A "resource" that is represented, by way of example, may be a processor, data storage, RAM, communication bandwidth, license authority, and so forth. Thereafter, a requester may submit a request for resources to run a "job" that will consume those resources.

An aspect of the present disclosure is to change the method by which the system evaluates requests for resources whereby the list of resources that are being evaluated for allocation will also be evaluated to look at the relative scalability or speed on a per request basis. This means that the system does not just look at an absolute value or attribute of the node or resource, but also looks at the effectiveness of that respective node or resource in satisfying a workload request of a similar nature to the one currently being processed. Once the system has that information, the system can look at the worst case scalability or execution time for that request, plus all the different types of resources that are being considered. Once the system has that effective minimum scalability or speed associated with the consumption of these resources, the system can then not only incorporate the wall clock limit in determining the range of execution, but the system can actually also incorporate the speed factor to determine how long the job would run and what the scaled wall clock limit would be. Consequently, once the system is aware of the scaled wall clock limit, the system determines what the completion times are and then returns a range of completion times opposed to a range of start times.

The present disclosure provides for modifications of advanced reservation range selection determining the timeframe and the resource set on which a particular request, such as a multi-resource request, can be executed. In previous efforts, this was accomplished by determining a set of available ranges when resources were actually available for usage and then converting those into an aggregate range of available timeframes representing times in which the job could actually start and be guaranteed to have adequate resources for completion. Herein, that algorithm is modified such that the system incorporates completion time rather than availability time. A hybrid approach may also be applied. The main benefit of this approach is that the system analyzes multiple sets of resources and their associated requirement and determines a timeframe which they could all complete which would incorporate scaling information or variable heterogenesis resource capability information that is per job specific.

FIG. 1 illustrates an example request or job with a wall clock time requirement, in this case, of 240 units or seconds. A job submitted to consume resources in a compute environment will only run as fast as the slowest system. FIG. 1 illustrates various nodes $N_1$, $N_2$, $N_3$, $N_4$ and relative times to the wall clock limit. The slowest resource is represented as a 1.0 which means it will process the request in 240 units of time. The first step in this process is, in response to a request for resources, the system analyzes resources that can be feasibly matched to the request. The system may also look for feasible resources that with no workload could potentially satisfy the request. Once the system has established its list of resources (in this case $N_1$-$N_4$ have been selected from a greater set of resources), it then analyzes each of those resources to determine their effective speed or capability of executing the compute aspects or fulfilling the requirements of the request $J_1$. As shown in FIG. 1, node 1 has a relative speed component of 1.0. Node 2 can process $J_1$ faster and so has a speed of 1.5. A speed of 1.5 is calculated by dividing 240 by 1.5 to arrive at 160, which means that $N_2$ could process that job in 160 units of time rather than 240 units. $N_3$ has a speed of 1.2 and node $N_4$ has a speed of 1.0. Each of these entries thus indicates the capability of individual nodes of processing the request $J_1$. These times may represent nodes or some other resource or grouping of resources. For example, it may be a cluster of resources and its speed relative to other clusters in a grid. These values in FIG. 1 represent a division of the wall clock speed to determine an effective duration.

The availability ranges relate to when the resources are not being consumed or dedicated to anything else. FIG. 2A illustrates availability ranges 102, 104, 106, 108, 110, 112, 114, 116, 118 and 120 on a per node basis. These may represent, for example, processor availability on these nodes over time. In this example, there are four nodes. Job $J_1$ is shown by way of example. In the prior application, the system would simple collapse all these available ranges into a cumulative availability range (shown in FIG. 2B herein and FIG. 2B of the parent case). Note the correlation between the timing of available ranges in FIG. 2A with the start time ranges shown in FIG. 2B. These are per node ranges and represent a cumulative available range.

Figure 2B:
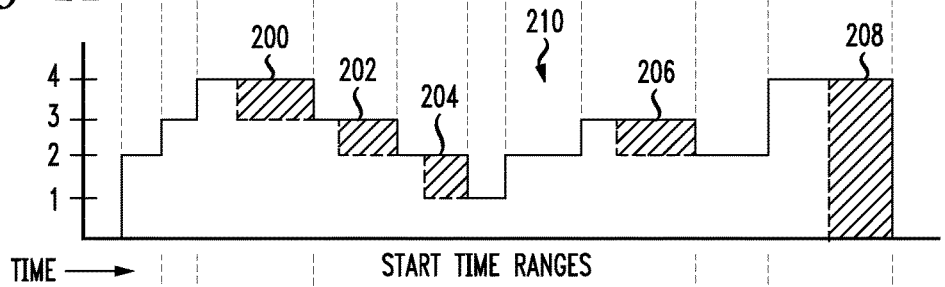
FIG. 2B illustrates a start time range mapping.

Pre-filtering may occur with the available range shown in FIG. 2B to remove items such as shorter ranges 118 that are not long enough to insure that enough resources are available for the full wall clock limit represented for $J_1$. Therefore, this pre-filtering would perform such tasks as eliminating parts of the range that should not be included in the analysis such as range 118. (FIGS. 2B and 2C do not show any filtering of the ranges of FIG. 2A)

Figure 3:
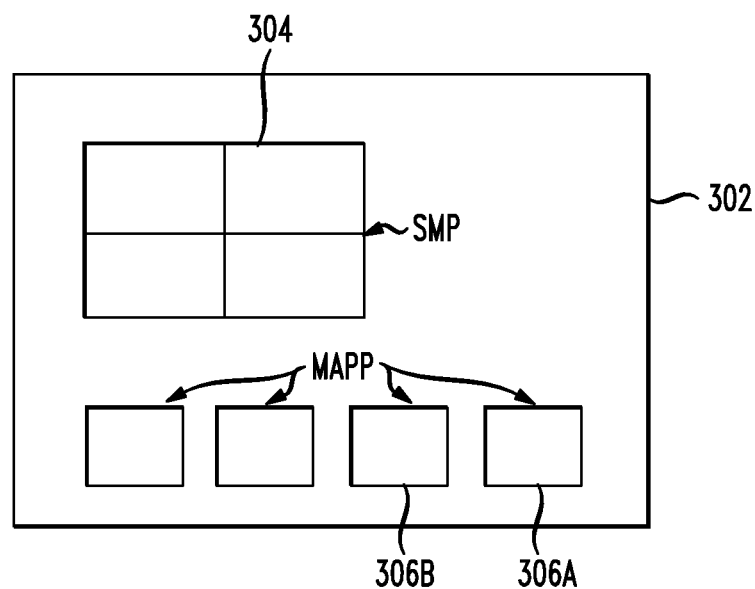
FIG. 3 illustrates a node with various SMD or MMP contexts.

We turn temporarily to a discussion of FIG. 3. FIG. 3 illustrates a single node 302 with several features. This node is treated as a cluster. Thus within this cluster there may also be nodes. In one aspect of the disclosure, there is a different approach for symmetric multi processing (SMP) and massively multi-processing (MMP). If there are SMPs then the system preferably does not filter as discussed above. SMP means that certain resources or nodes are all on the same machine and the system can actually transparently migrate an application that is running one place to another "under the covers." If the context is distributed or an MMP context, then the system preferably filters on a per job basis or according to the wall clock limit upfront. When the processing remains on the same machine as in SMP then there may be, by way of example, four different nodes on the same machine 304 as shown in FIG. 3. FIG. 3 also shows where a single node represents a cluster 302 as a grouping 304 that has four products or could, in the MMP context, have four nodes 306A, 306B, 306C and 306D that each has one product. In the MMP scenario, the system collapses the time ranges and then continues to process, and may or may not filter. If the context is SMP, then the system preferably filters then collapses. The basic point here is that the system may modify whether or not to filter and what order to filter and collapse based on whether the approach is associated with SMP or MMP.

As introduced above, an aspect of the disclosure is to look at completion time ranges. FIG. 2B illustrates the cumulative available start ranges of the approach in the parent case. For example, blocked out areas 200, 202, 204, 206 and 208 represent areas that are unavailable because jobs cannot start during those periods. Since jobs require time to complete, they cannot start too near the end of the available range. The scaled wall clock times shown in FIG. 1 may or may not be used to block out these regions. The system looks at how long the job needs and its completion range. Because the system analyzes completion time ranges it can merge this information with another system that has a different wall clock limit and can do an analysis that automatically incorporates this capability and returns the effective co-allocation completion range.

FIG. 2B illustrates incorporating execution time into start time ranges for the purpose of co-allocation either across time or across space. Blocks 200, 202 and 204 each show a space that is blocked out, which represents space that is associated with an availability range but not associated with a start range. The process of translating an availability range over to a start range is basically the process of subtracting the wall clock time of the task off of the end of that range. The range consists of a start time and an end time, first as an availability range. When it is translated over to a start time it becomes a range from start time to end time minus the wall time. This effectively lets the system know when a job can start and complete inside that availability range. An important point to note is that each range, as it is evaluating a different resource or a different rack, could potentially have a different wall time; it is dependent upon the amount of time that particular task requires to execute. That can be based on two different factors. One, inherently the task itself takes a different amount of time. One task may be more complicated than another. Or if the system is allocating multiple resources to a single requirement then the amount of wall time can be changed or varied based on the effective speed of the resource that is computing that task. For example, if one has a job that requires one hour and on a processor that executes at a speed with a relative speed factor of 1.0, then if the system were to run that same task on a machine that had a speed with a factor of 2.0 then it would be able to complete in half that time, or in 30 minutes. In another scenario, if it ran on a machine with an effective relative speed of 0.5 it would run in a period of 2 hours. If the algorithm associated with generating start time ranges properly incorporates the effective wall time of that task on that resource then the system can automatically inherit or incorporate that machine's speed information into the mathematics of range analysis and co-allocation default.

Therefore, an aspect of the disclosure is to take the wall clock into account in the modified co-allocation mapping. The modified co-allocation mapping properly reflects the relative machine speed of the resources that would be computing the tasks. The end result is that reservations will guarantee that each allocated computer resource can complete that task taking into account its relative speed. A second benefit of this approach based on when co-allocating multiple processing requirements at the same time, one requirement may take less time than another. The system can determine when to start each of these and still allow them all to complete at the same time. In fact, the system can also mix and match both at the same time in a single task that requires multiple computer resources at variable speed and mix that with multiple tasks that inherently require different amounts of speed.

So ultimately when the system makes the reservation, and then when workload consumes the resources, the workload manager can squeeze more utilization out of the resources in the compute environment. This approach improves the utilization because the workload manager can do a better job of finding more holes or more locations which the task can complete successfully both in space and time. An alternative approach could be to base the analysis off the completion time range as opposed to start time range simply by inverting the logic. However, it may not matter if it is the start time range or the end time range. The system still needs to use the same procedure taking into account the relative wall time of each individual task on a per resource basis to determine when and where to make the optimal reservation.

Figure 2C:
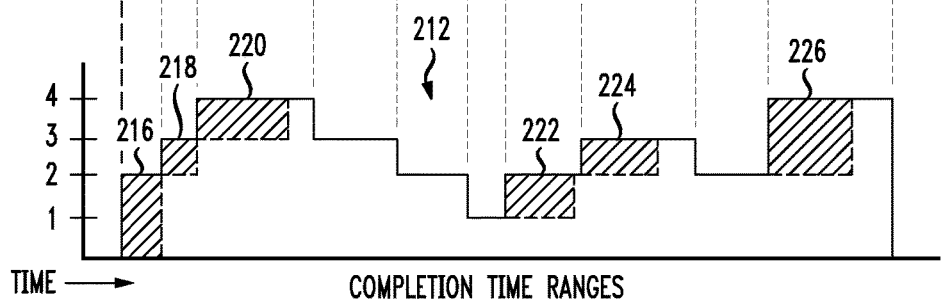
FIG. 2C illustrates a completion time mapping.
Figure 2D:
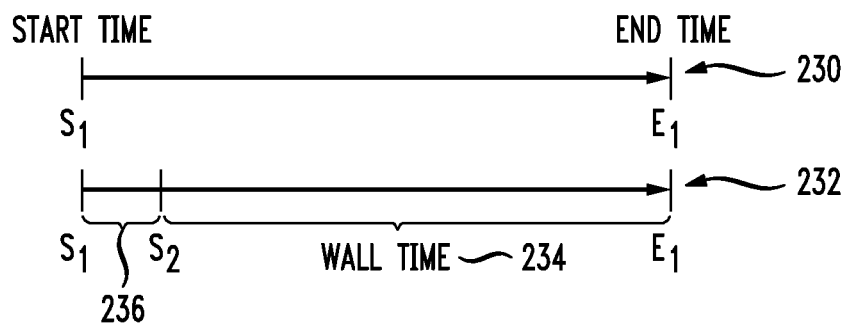
FIG. 2D illustrates use of a completion time analysis.

If the system uses the completion time range, it can then launch tasks scattered about multiple resources such that all tasks complete at the same time as opposed to start at the same time. Both methodologies (start time and completion time) will make certain resources are available for an adequate duration to allow jobs to execute, but in a completion time range the system makes certain that all tasks complete at the same instant. FIG. 2D illustrates the benefit of using the completion time analysis. Row 230 is shown having a start time S1 and an end time at E1. The wall time is not taken into account. The resources which would be required or reserved to process that job will be reserved for the entire time from S1 to E1. However, under a completion time analysis, once the completion time range has been determined or a potential target time has been reached, in which the system knows that all the tasks can complete and all the resources are available in both space and time and that decision has been logged, the system can then make a determination on exactly when to actually start the task. Thus the new start time for the task is represented on row 232 in which a new start time S2 is shown, which represents the end time E1 minus the wall time 234. The time between S1 and S2 is shown as time 236 which represents time or resources which may be saved or used for other jobs. If this analysis is done for each variable task associated with a request for resources, then the system will vary the actual start times for these tasks simply by subtracting the effective execution time off of each resource.

A determination may be made by the system regarding whether to use a start time analysis or completion time analysis. For example, a job may be better suited to end at the same time with its various tasks because of its date retrieved and storage requirements. Other jobs may need to start all their tasks at the same time while others may be agnostic to such a requirement. Thus, an analysis of the job, the compute environments user credentials, and/or other factors may be involved in selecting a start time or end time or hybrid analysis. User credentials may force the system to select the start or end time in favor of the use's job if there is a conflict between the benefit to the user versus the configuration or maximum or substantially maximum utilization of the compute environment.

The system may also alternate or mix and match a start time and completion time analysis. They are both useful in different types of tasks. An important value for completion time is being able to complete and simply being able to find a place where all the resources are available. Some tasks are better situated to take advantage of all starting at the same time which indicates that a start range may be better. Other tasks are best if they are all processing off the same input data then the input data record won't be available till a certain time. Then the start time range may be selected if they both need to generate the results and the system is limited on the amount of disk space available, and then the user may want a completion time range so they all transmit the final data at the same time.

As mentioned above, an aspect of the disclosure is that part of the intelligence includes a selection component for selecting between using a start time or a completion time in the co-allocation analysis. A manual input option may be provided for a user to input preferred or his/her own analysis or labeling of what type of computation to perform. For example, a start time would minimize the amount of prerequisite resources being required because they will be consumed all at the very beginning and the system can free up those resources as soon as they have all been picked up by the task. The completion time may be selected if the end result is the biggest consumer resource and the system wants it all available at the same moment so it can be transmitted or stored. The analysis may thus include a just-in-time start and/or a just-in-time end. The decision on whether to co-allocate based on start or complete time or a hybrid of the two may be based on at least one of the job, the resources, user selection, user payment, status of the compute environment, user credentials, or any other mix of factors.

In a hybrid approach, the system may first determine whether an exclusive approach based on either start time or completion time is optimal. This analysis may be based on one or more factors such as compute environment optimization, user credentials, components of the job (data needs, processor needs, timing needs for data retrieval, writing and processing, etc.), licensing or other administrative needs or requirements, etc. If the analysis yields a result to just use start time or completion time, then the system proceeds to reserve resources and then run the job in the compute environment. If the analysis yields a result that is a hybrid, then the system may utilize a start time analysis for some aspect of the job and completion time for another. This may be done using two separate analyses and separately reserving resources for different aspects of the job or in any other fashion. Then the resources are reserved and the system will then process the job accordingly. The scaled wall clock data is inherently used in these processes to improve system performance but it is not necessary.

The system may automatically configure such analysis and selection. The system may dynamically decide based on which resources are most constrained. It could be configured by administrator to be selected on a per job basis. It could be selected according to a user profile, it could be selected based on historical learned information that the schedule of the system. Further, users may pay for this kind of optimization once, on a per job or per request basis, or in some other manner.

The next step, once the system actually determines the relative speed and the system has selected nodes that are feasible or available, then the system analyzes other commitments that have already been made for by these resources for other workload or other purposes. This is represented for node $N_1$ by FIGS. 102, 106 and 108 representing that at those particular timeframes in which the block appear, those resources are available for executing some component of $J_1$. This does not necessarily mean that it can complete $J_1$, it simply says it is available. $N_2$ is evaluated and it is shown that the timeframe represented by 104, 110 and 112 are available so on down through $N_3$ and $N_4$. These constitute per node availability ranges. The current model is based on availability ranges or start time ranges, with an aggregate or summary of the resource availability over time to generate the graph which is represented in FIG. 2B. Next, the system looks at the timeframe at which a job could potentially start and the system eliminates the spaces that are represented by 200, 202, 204, 206 and 208. So those indicate times that are not available for the application to actually start.

The approach of FIG. 2B, while showing when jobs can start, does not incorporate relative speeds into the resulting range graph. In one aspect, instead of translating the ranges of FIG. 2A into an availability range, the system translates it into a potential completed of time range as shown in FIG. 2C. This represents when the application or job could potentially complete. The timeframes which are not eligible are 216, 218, 220, 222, 224, 226. These are timeframes which the particular job cannot start because of the time it requires to consume the resources. Once the system has that information regarding when the job can complete, the system can then do a merger with another requirement or another test and determine a co-allocation request of multi-resource types or multiple collections of resources. For a different resource or other parameters, such a merger will represent the timeframes in which those jobs can complete even if those jobs or those resources have varying scalability factors or varying speed factors. This information is now incorporated and this resulting information can be used to map out when resources are actually available and can be merged together. Once they are merged together, final co-allocation ranges are established. That information can be extracted back out and resulting start times may be determined inversely by re-establishing the scaled wall clock limit. The system can determine the associated start time requirements for each individual requirement that went in to be considered. A reservation of the appropriate resources can be made and then those reserved resources can be consumed and process the job.

Scalability in this context relates to the speed or how well each individual resource scales its speed factor for the particular request of interest. So with this approach, not only can one have multiple racks of nodes or processes that each run at a different rate on the same set of resources, one can also have multiple racks that run at different rates on different sets of resources. Once the system establishes the start points that it is interested in, because it knows the scalability, it can reverse calculate the start times that are required to obtain that position.

The available range of start times calculated based on knowledge of end times are shaded in FIG. 2C graph 212. The system looks for a time frame in which all the requirements on all the resources can be satisfied on the same time. Once the system knows that it has an overlap and because the system knows when a job will complete, how fast it will run and at what speed, the system then calculates the start time or start time range available that is required to execute the job or request.

In practice, the start time for various calculations will likely start at the same time. Some of them will complete a little bit earlier, others will compete on the expected deadline. But all or most will all be complete and because the system is also looking at the worse case scenario of all the resources, the system guarantees that everything will fit inside that space 212.

In the scenario of the parent application, in the analysis, jobs would start at the appropriate time, but some might end after the allocated availability time. In that case, it was more difficult to properly merge them. This is because to properly merge them would require mapping of everything to the worse case superset. So, the worst possible rack on the worst possible node. However, the approach of the present disclosure does not strain the analysis in that way.

Figure 4A:
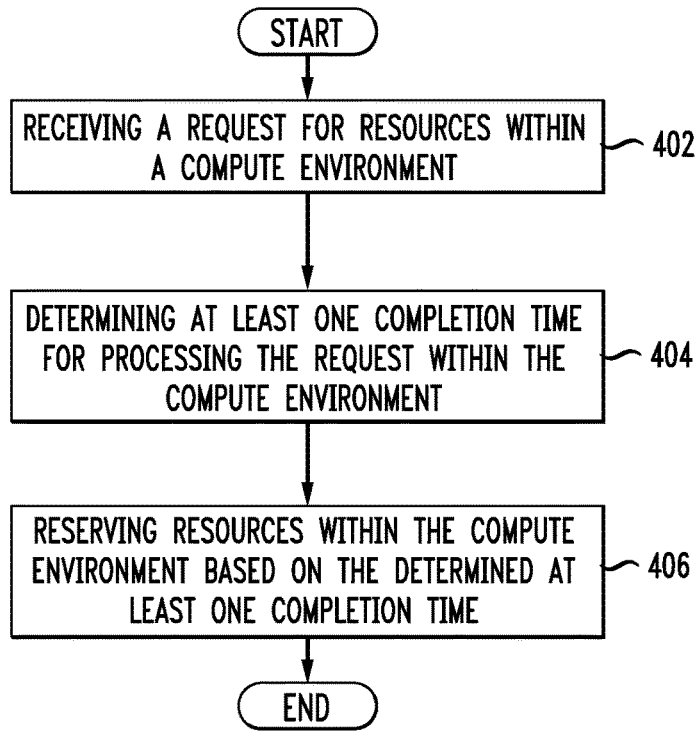
FIG. 4A illustrates a method embodiment.
Figure 4B:
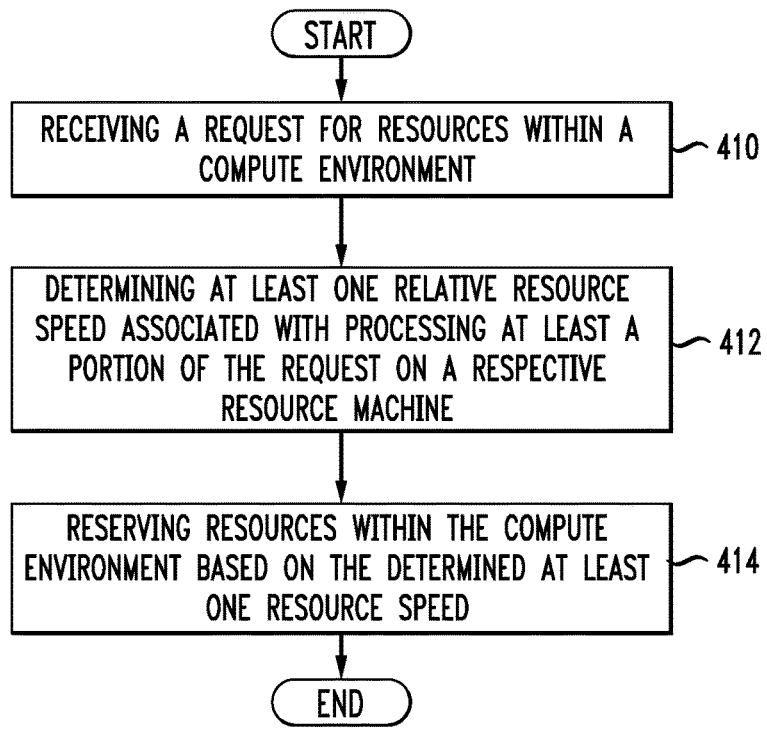
FIG. 4B illustrates another method embodiment.

FIG. 4A illustrates a method embodiment of the disclosure. A preferred embodiment relates to reserving resources in a compute environment according to a method comprising receiving a request for resources within a compute environment (402), determining at least one completion time associated with at least one resource type required by the request (404) and reserving resources within the compute environment based on the determined at least one completion time (406). Another embodiment is shown in FIG. 4B which shows receiving a request for resources within a compute environment (410), determining at least one relative resource speed associated with processing at least a portion of the request on a respective resource machine (412) and reserving resources within the compute environment based on the determined at least one resource speed (414).

The method aspect of the disclosure may further comprise determining a range of completion times for the request. The step of determining the at least one completion time may at least in part be based on wall clock scaling information that is job specific. A system practicing the disclosure may further identify feasible resources within the compute environment for the request or analyze each identified feasible resource for its effective speed in fulfilling the request. For example, the various resources in a compute environment, processors, hard drives, communications bandwidth, etc., may each be analyzed for its respective effective speech in fulfilling the request such that the effective speed or relative resource speed may be utilized when making reservation decisions that are more efficient and more effective in maximizing efficiency within the compute environment. The method may further comprise analyzing workload commitment for each identified feasible resource, wherein the analysis of workload commitments represents a per node or resource availability range. The per node or resource availability range may be translated into a potential completion time range. Follow on steps may involve merging the potential completion time range with at least one other requirement and determining a co-allocation for multiple collections of resources that can meet the request. Such a merging may represent a merging of at least two mappings of potential completion times for diverse resources in the compute environment.

The method above may also further comprise determining at least one start time associated with the request using a scaled wall clock limit for the request. The at least one completion time for the request may be determined based on a worst case scenario for any particular resource. For example, if a bandwidth range is 100 MB-1000 MB, the system may make its determination based on a bandwidth of 100 MB. It may also perform further analysis on the resource and make its determination based on one or more other factors such as average resource performance or predicted performance based on other factors such as time of day or user history having the resource reserved.

FIG. 5 illustrates another example method embodiment and shows a method of co-allocating resources within a compute environment. The method comprises receiving a request for resources requiring a first type of resource and a second type of resources (502), analyzing completion times associated with the first type of resource (504), analyzing completion times associated with the second type of resource (506), generating a co-allocation map between the first type of resources and the second type of resources based on the analysis of completion times for the first and second type of resource (508) and reserving resources according to the generated co-allocation map (510). Generating the co-allocation map may comprise identifying a reduced map of quantities of resources that can simultaneously satisfy the first request and the second request. The co-allocation map may comprise all time frames where available resources exist that satisfy the first request and the second request. In this process, the possible types of resources may consist of at least one of: compute resources, disk storage resources, network bandwidth resources, memory resources, licensing resources, user preferences and user data.

Generating the co-allocation map may further comprise identifying an intersection of the availability of each of the first type of resource and the second type of resource. This may involve generating the co-allocation map by determining intersecting time frames in which both the first request and the second request may be simultaneously satisfied and generating a resulting array of events describing the intersecting time frames. The resulting array of events may comprise at least one of resource quantity, resource quality, time frames, quality of information and cost.

As with the embodiment of FIGS. 4A and 4B, the embodiment shown in FIG. 5 may be based not on completion time but on at least one relative resource speed required to process at least a portion of a request. Thus, this relative or effective resource speed may be analyzed for at least one resource within the compute environment and a co-allocation map may be generated based on the resource speeds for the first and second type of resource. This effective speed usage may then be applied independently or in connection with the completion time to generate the co-allocation maps. Also as discussed above, whether start times or completion times will be used in the co-allocation analysis may also be applied in connection with knowledge of the relative or effective resource speed such that the co-allocation request may be optimized for the request for resources. These various methods may also include an analysis or determination of whether a hybrid approach may be utilized to further improve the co-allocation request to maximize or substantially maximize use of resources. Such an analysis may further be weighted to favor maximum or substantial maximum use of resources, favor job performance, user performance, user convenience or any other balancing of interests in performing the analysis and preparation for reserving resources for the co-allocation request.

Figure 6:
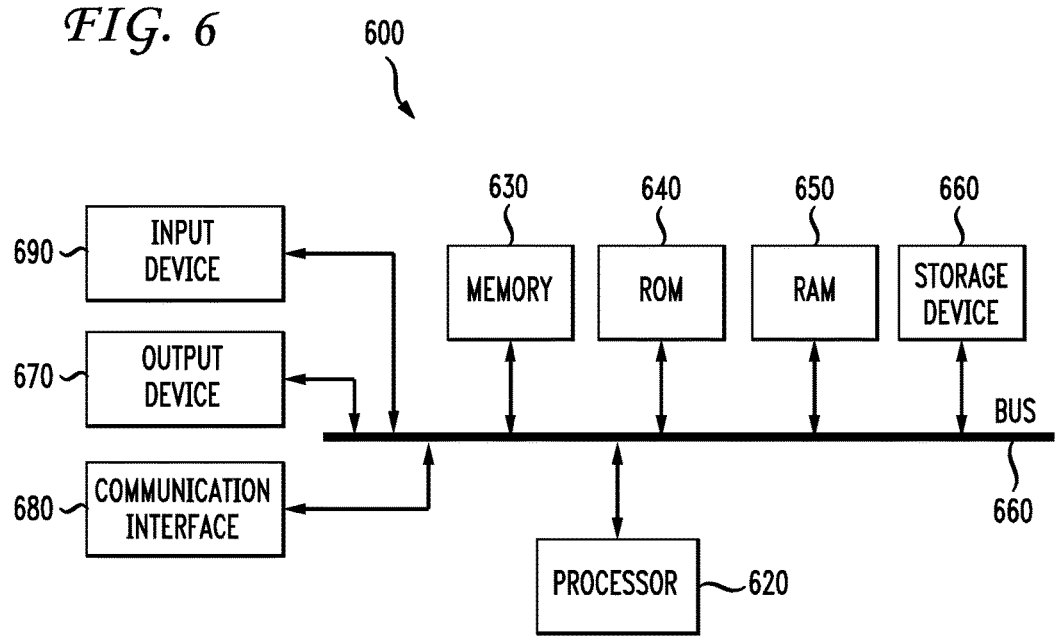
FIG. 6 illustrates a system embodiment.

With reference to FIG. 6, an exemplary system for implementing the disclosure includes a general-purpose computing device 600, including a processing unit (CPU) 620 and a system but 610 that couples various system components including the system memory such as read only memory (ROM) 640 and random access memory (RAM) 650 to the processing unit 620. Other system memory 630 may be available for use as well. It can be appreciated that the disclosure may operate on a computing device with more than one CPU 620 or on a group, cluster or grid of networked computing devices to provide greater processing capability. The system but 610 may be any of several types of bus structures including a memory bus or memory controller, a peripheral bus, and a local bus using any of a variety of bus architectures. A basic input/output (BIOS), containing the basic routine that helps to transfer information between elements within the computing device 600, such as during start-up, is typically stored in ROM 640. The computing device 600 further includes storage means such as a hard disk drive 660, a magnetic disk drive, an optical disk drive, tape drive or the like. The storage device 660 is connected to the system bus 610 by a drive interface. The drives and the associated computer readable media provide nonvolatile storage of computer readable instructions, data structures, program modules and other data for the computing device 600. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bitstream and the like, may also be used in the exemplary operating environment.

To enable user interaction with the computing device 600, an input device 690 represents any number of input mechanisms, such as a microphone for speech, a touch-sensitive screen for gesture or graphical input, keyboard, mouse, motion input, speech and so forth. The device output 670 can also be one or more of a number of output means. In some instances, multimodal systems enable a user to provide multiple types of input to communicate with the computing device 600. The communications interface 680 generally governs and manages the user input and system output. There is no restriction on the disclosure operating on any particular hardware arrangement and therefore the basic features here may easily be substituted for improved hardware or firmware arrangements as they are developed.

Figure 7:
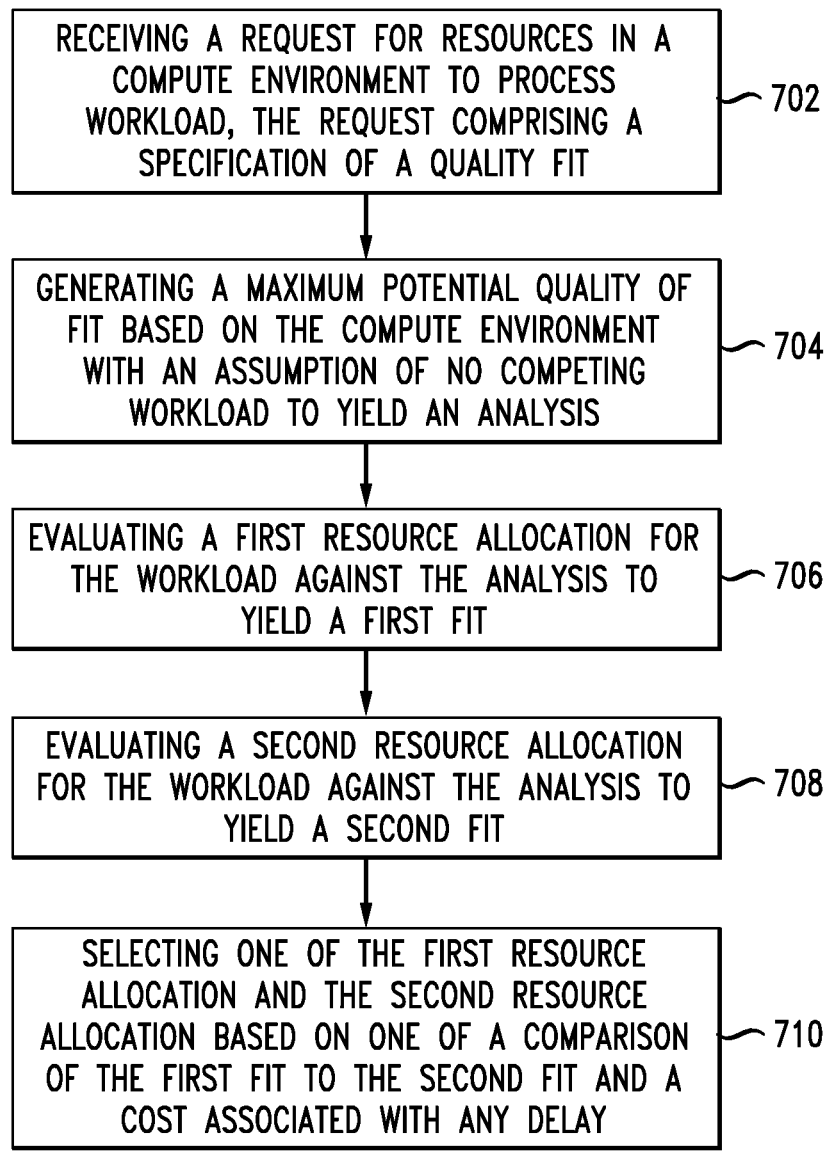
FIG. 7 illustrates another method embodiment.

We next turn to the disclosure that covers the current claims of this continuation-in-part application. This embodiment is associated with FIG. 7. As shown in FIG. 7, a method includes receiving a request for resources in a compute environment to process workload, the request including a specification of a quality fit (702). The specification of the quality fit can be simply a policy that is going to be enforced for this request for resources and the policy can provide a control of the quality fit that the system will schedule against. As an example, the system may be instructed, based on the policy, to run the job within 2 hours but wait until up to 2 hours to get a 70% quality fit. However, if the system does not ever launch before that time, the system must get at least a 50% quality fit. The policy could say to never run the job if the system is going to give the job a terrible fit. As noted above, an example step that is in the initial stages of this process can include an understanding of what the maximum or substantial maximum potential quality of fit is so that a relative number can be used because everything floats around the maximum or substantial maximum potential quality of fit. The system then takes the workload and evaluates that workload for an optimal placement if there is no competing workload and all the compute resources were healthy and available in operating at full performance. The system first does that evaluation to get the baseline and then from the baseline the system can consider various points of time with various resource allocations each optimized for those metrics. Then the system can determine at those various times what is possible and what makes that selection possible. Another piece that is important is that the system has a metric that balances response time against a metric.

An example of a quality fit is workload that is coded for a Linux operating system and particular hardware. If the workload runs on a Microsoft operation system and different hardware, it will not be a perfect fit. Quality of fit can be based on timing when the compute environment can be provisioned to receive the workload.

Returning to FIG. 7, the next step includes generating a substantial maximum potential quality of fit based on the compute environment with an assumption that no computing workload exists to yield an analysis (704). The system evaluates a first resource allocation for the workload against the analysis to yield a first fit (706). The system next evaluates a second resource allocation for the workload against the analysis to yield a second fit (708). Finally, the system selects one of the first resource allocation and the second resource allocation based on one of the comparison of the first fit to the second fit and optionally a cost associated with any delay. An example of a delay could be that the first fit or the second fit may be 1 hour later than the other. There may be a cost in terms of migration or other issues which are associated with that delay which are taken into account in claim 1.

The cost associated with the delay can be associated with a delay in time between a first time associated with the first resource allocation (such as a first time the workload could start using the resources) and a second time associated with the second resource allocation (such as a time when workload could starting processing on the second resources). Selecting one of the first resource allocation and the second resource allocation can include migrating the reservation of resources from the reservation to a new reservation of resources in one or at least one of space, time breadth, types of resources, etc.

It is noted that the substantial maximum quality of fit may include an assumption that less than the entire compute environment is available. Factors such as whether real, scheduled, or virtual workload exists, probability of failure of hardware or expiring of licenses, cost of software, hardware or electricity, and so forth the base-line analysis can be generated based on any number of factors. Thus, the "maximum" potential quality fit or "substantial maximum" may be a realistic potential quality fit against which allocations are compared.

The method can further include reserving resources in the compute environment based on the selecting step. The first fit and the second fit can be based on an application model associated with a workload. For example, if the application is a particular piece of software, then the software can identify the affinity of that software associated with the first resource allocation and the second resource allocation to identify a completion time or a quality of fit parameter that can then be used in the evaluation to determine whether to select one of the first resource allocation or the second resource allocation.

Next, a first time can be associated with the first fit and which can provide a variance of fit from the maximum potential quality of fit as noted above. Thus, the first resource allocation and the second resource allocation in terms of being a first fit or a good second fit, can be evaluated from the standpoint of the maximum potential quality of fit and their deviation from that.

In other words, once the system understands the maximum quality of fit it can use as a relative evaluation of the quality fit for particular evaluated resource allocations since all of those other qualities of fit would float around the maximum potential quality of fit. The system essentially takes the workload and evaluates that workload for an optimal or preferred placement at various times and resources according to a baseline maximum or reasonable potential quality of fit. From that baseline the system can consider various points in time with various resource allocations each optimized for those particular metrics and then can determine at which various times what is possible by way of establishing a reservation and then make that selection. A metric can balance the response time against the metric.

In another aspect, a method could establish the cost of delay measured against a benefit in the quality of fit improvement in order to come up with the final decision. In other words, the system could determine that there is a 50% quality of fit for a request coming in at noon, the resources associated with a 50% quality of fit being available at 12:30 PM. However, at 1:30 PM there may be resources that provide a 70% quality of fit. However, those compute resources are available an hour later than the earlier resources. So the system can identify a cost of that one hour delay and measure that against the benefit of the quality of fit improvement and so forth. Ultimately, the system will then come up with a final decision taking all of these factors into account. Therefore, in one aspect, a delay is associated with when workload can start in one of the first resource allocation and the second resource allocation. Further, the delay could be related to one of those times relative to a potential starting time or a maximum potential starting time or a starting time that is specified in a request for resources. Therefore, the delay could relate to a time associated with any number of factors.

In another aspect of this disclosure, the system utilizes an application model that provides data regarding particular software applications in what kinds of efficiencies a software application might have running on particular nodes, different operating systems, different hardware, and so forth. Thus, in performing this pre-reservation analysis, the system identifies the efficiencies of the particular application on the various nodes under the control of a workload manager. The system can know what kind of efficiency a workload will have even if that workload involves a division of tasks placed across a compute environment with a particular topology. The system can run a network or a task communication model to effectively understand how the workload works in an aggregate situation and identify its performance. The system can either externally import this model or internally maintain the model or use a manually specified list of performance criteria such as simply identifying a particular performance value. Then, once the performance value is requested manually or identified automatically by the system, then the system tries to structure that workload so basically the system can benchmark and get the evaluation and then the administrators or professional service people would go ahead and enter those numbers such that the system basically generates a very simplified model based on point observation.

It is further noted that while typically two examples are provided in a pre-reservation context, any number of potential reservations at various times and/or compute resources could be evaluated in a comparison. Clearly, more than two is possible. For example, the system receives a request for resources at noon for completion by 6:00 PM. An analysis could occur in which 10 different potential reservations could be made each with their respective analysis, and optimal or even a less optimal set of resources at a particular time can be chosen for actually processing the workload.

Next, it is specifically noted that while the above disclosure typically involves a pre-reservation analysis to identify the preliminary potential available times and then before establishing the reservation, performing the analysis on each one of those so as to choose one that is appropriate. In another aspect of this disclosure, the system in probing could essentially establish an initial reservation of the resources at particular times when doing the analysis. Then, the system could establish a reservation and then in performing the type of analysis disclosed above, the system could arrive at an improved reservation which has a better quality of fit according to the policy set forth associated with the workload. In this case, the system could perform a reservation migration and move the reservation in space and/or time as has been previously disclosed.

By improving a quality of fit in the manner disclosed above, applications can have improved completion times and actually complete sooner than they otherwise would complete by moving to a different time or running later on better resources. The above approach also is anticipated to consume less power inasmuch as the workload is operating on better resources and more power efficient resources for a particular application. In other cases, when the system actually consumes less network resources, by having an improved topological layout.

In yet another improvement, the system could have a reduced cost possibly due to a lower power cost or time of day possibly due to reduced demand during that time of the day for other shared dedicated resources. Amazon.com may, during business hours, establish a charge rate that is different during off hours or weekends. A reduced cost, reduced power and improved utilization of compute resources and reduced costs are factors in the analysis but also improved locality to data or storage resources. In other words, the quality fit may include a suggestion that data be stored so it can be processed as close to storage of other data such that there is a reduction in network resources to more data from one place to another.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the disclosure are part of the scope of this disclosure. Accordingly, the appended claims and their legal equivalents should only define the disclosure, rather than any specific examples given.

I claim:

1. A method comprising:
receiving a request for resources in a compute environment to process workload, the request comprising a specification of a quality fit, wherein the specification of the quality fit includes an operating system type and a computer hardware type;
generating a substantially optimal potential quality of fit based on the compute environment and the specification of the quality fit, with an assumption of no competing workload and all the computing resources were healthy and operating at full performance, to yield an analysis;
evaluating a first resource allocation for the workload with different resource allocation and time of allocation than those of the optimal potential quality fit against the analysis to yield a first fit relative to the optimal potential quality fit;
evaluating a second resource allocation for the workload with different resource allocation and time of allocation then those of the optimal potential quality fit and the first fit against the analysis to yield a second fit relative to the optimal potential quality fit; and
selecting one of the first resource allocation or the second resource allocation based on one of a comparison of the first fit to the second fit and a cost associated with a delay in allocation of the first fit or the second fit.

2. The method of claim 1, further comprising:
reserving resources in the compute environment based on the selecting.

3. The method of claim 1, wherein the delay relates to a start time when workload can start in one of the first resource allocation and the second resource allocation.

4. The method of claim 1, wherein one of the first fit and the second fit are based on an application model associated with the workload.

5. The method of claim 1, wherein a first time associated with the first fit provides a variance of fit from a substantial maximum potential quality of fit.

6. The method of claim 1, wherein the potential quality of fit is a substantial maximum potential quality of fit.

7. A system comprising:
a processor; and
a computer-readable storage medium storing instructions which, when executed by the processor, cause the processor to perform operations comprising:
receiving a request for resources in a compute environment to process workload, the request comprising a specification of a quality fit, wherein the specification of the quality fit includes one of an operating system type and a computer hardware type;
generating a substantially optimal potential quality of fit based on the compute environment and the specification of the quality fit, with an assumption of no competing workload and all the computing resources were healthy and operating at full performance to yield an analysis;
evaluating a first resource allocation for the workload with different resource allocation and time of allocation than those of the optimal potential quality fit against the analysis to yield a first fit relative to the optimal potential quality fit;
evaluating a second resource allocation for the workload with different resource allocation and time of allocation then those of the optimal potential quality fit and the first fit against the analysis to yield a second fit relative to the optimal potential quality fit; and
selecting one of the first resource allocation or the second resource allocation based on one of a comparison of the first fit to the second fit and a cost associated with a delay in allocation of the first fit or the second fit.

8. The system of claim 7, wherein the computer-readable storage medium stores further instructions which, when executed by the processor, cause the processor to perform a further operation comprising:
reserving resources in the compute environment based on the selecting.

9. The system of claim 7, wherein the delay relates to a start time when workload can start in one of the first resource allocation and the second resource allocation.

10. The system of claim 7, wherein one of the first fit and the second fit are based on an application model associated with the workload.

11. The system of claim 7, wherein a first time associated with the first fit provides a variance of fit from a substantial maximum potential quality of fit.

12. The system of claim 7, wherein the potential quality of fit is a substantial maximum potential quality of fit.

13. A non-transitory computer-readable storage device storing instructions which, when executed by the processor, cause the processor to perform operations comprising:
receiving a request for resources in a compute environment to process workload, the request comprising a specification of a quality fit, wherein the specification of the quality fit includes one of an operating system type and a computer hardware type;
generating a substantially optimal potential quality of fit based on the compute environment and the specification of the quality fit, with an assumption of no competing workload and all the computing resources were healthy and operating at full performance to yield an analysis;
evaluating a first resource allocation for the workload with different resource allocation and time of allocation than those of the optimal potential quality fit against the analysis to yield a first fit relative to the optimal potential quality fit;
evaluating a second resource allocation for the workload with different resource allocation and time of allocation then those of the optimal potential quality fit and the first fit against the analysis to yield a second fit relative to the optimal potential quality fit; and
selecting one of the first resource allocation or the second resource allocation based on one of a comparison of the first fit to the second fit and a cost associated with a delay in allocation of the first fit or the second fit.

14. The non-transitory computer-readable storage device of claim 13, wherein the computer-readable storage device stores instructions which, when executed by the processor, cause the processor to perform a further operation comprising: reserving resources in the compute environment based on the selecting.

15. The non-transitory computer-readable storage device of claim 13, wherein the delay relates to a start time when workload can start in one of the first resource allocation and the second resource allocation.

16. The non-transitory computer-readable storage device of claim 13, wherein one of the first fit and the second fit are based on an application model associated with the workload.

17. The non-transitory computer-readable storage device of claim 13, wherein a first time associated with the first fit provides a variance of fit from a substantial maximum potential quality of fit.

18. The non-transitory computer-readable storage device of claim 13, wherein the potential quality of fit is a substantial maximum potential quality of fit.

* * * * *